United States Patent Office.

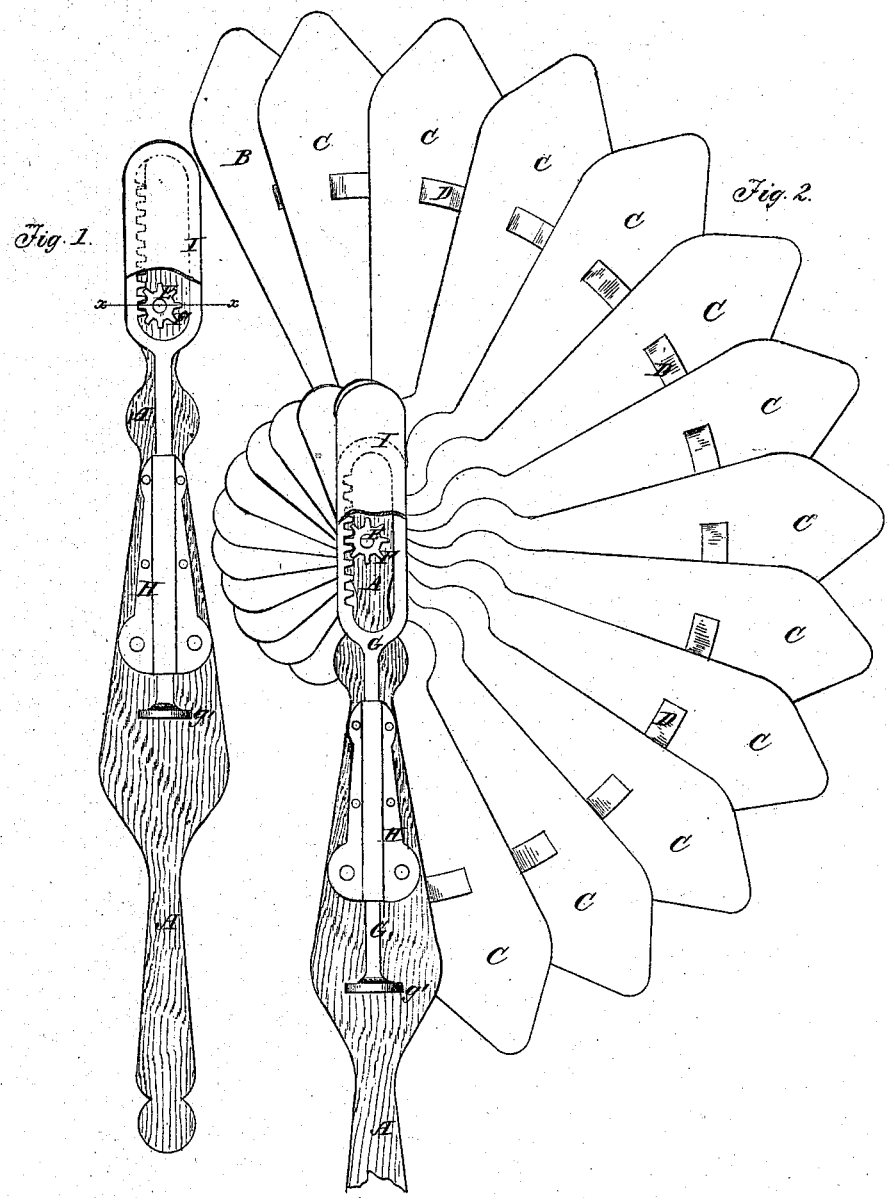

GEORGE BORDES, OF NEW YORK, N. Y.

Letters Patent No. 108,096, dated October 11, 1870.

IMPROVEMENT IN DEVICES FOR OPENING AND CLOSING FANS.

The Schedule referred to in these Letters Patent and making part of the same.

*To all whom it may concern:*

Be it known that I, GEORGE BORDES, of the city of New York, in the county and State of New York, have invented a new and useful Improvement in Device for Opening and Closing Fans; and I do hereby declare that the following is a full, clear, and exact description thereof, which will enable others skilled in the art to make and use the same, reference being had to the accompanying drawing forming part of this specification.

Figure 1 is a side view of my improved fan closed, part being broken away to show the construction.

Figure 2 is a side view of the same partly opened, part being broken away to show the construction.

Figure 3 is a detail sectional view of the same, taken through the line $x\ x$, to show the construction.

Similar letters of reference indicate corresponding parts.

My invention has for its object to furnish an improved device for opening and closing hand-fans, which shall be simple in construction, effective in operation, and not liable to break or get out of order; and It consists in the parts by which the fan is opened and closed, in combination with the other parts of the fan, as hereinafter more fully described.

A and B are the outer leaves of the fan, one of which, as A, is extended, to serve as a handle.

C are the other leaves, which are connected, near their outer ends, to each other, and to the outer leaves A B, by a ribbon, $D_x$ in the ordinary manner.

The inner ends of the leaves A B C are connected and pivoted to each other by a bolt or rod, E.

The end of the rod E is securely attached to the short outer leaf B, so that the said leaf may be carried around by and with the said rod in its revolution.

To the other end of the rod E is attached a small gear-wheel, F.

G is a bar, sliding in a keeper, H, attached to the outer side of the long outer leaf B.

The upper end of the bar G is made wide, and has a slot formed in it, of such a width as to receive the gear-wheel F, the teeth of said gear-wheel meshing into teeth formed along one edge of the slot in the bar G, the other edge of said slot serving as a guard to keep the wheel and bar in gear with each other.

By this construction, by sliding the bar G in one direction, the rod E will be revolved, carrying the outer leaf B with it, which leaf draws the other leaves C after it, thus opening the fan. In the same manner the fan is closed, by moving the bar G in the other direction.

Upon the lower end of the bar G is formed a thumb-piece, $g'$, for convenience in operating it.

The gear-wheel F and slotted upper end of the bar G should be covered with a keeper or cap, I, to hide them from view, and which may also serve as a guide and support to the bar G as it is moved back and forth.

Having thus described my invention,

I claim as new and desire to secure by Letters Patent—

The sliding slotted rack-bar G, pinion F, and pivot-rod E, combined as described, with a fan, A B C D, for the purpose set forth.

The above specification of my invention signed by me this 16th day of August, 1870.

GEORGE BORDES.

Witnesses:
 JAMES T. GRAHAM,
 T. B. MOSHER.